United States Patent
Diaz et al.

(10) Patent No.: US 9,903,421 B2
(45) Date of Patent: Feb. 27, 2018

(54) AIR CLUTCH COVER

(71) Applicant: CNH Industrial America, LLC., New Holland, PA (US)

(72) Inventors: Ricardo Diaz, Chicago, IL (US); Marvin A. Prickel, Homer Glen, IL (US); Austin Eugene Bello, Wahiawa, HI (US)

(73) Assignee: CNH Industrial America LLC, New Holland, PA (US)

( * ) Notice: Subject to any disclaimer, the term of this patent is extended or adjusted under 35 U.S.C. 154(b) by 43 days.

(21) Appl. No.: 14/563,451

(22) Filed: Dec. 8, 2014

(65) Prior Publication Data

US 2016/0160940 A1 Jun. 9, 2016

(51) Int. Cl.
| | |
|---|---|
| *A01C 7/08* | (2006.01) |
| *F16D 13/08* | (2006.01) |
| *F16P 3/08* | (2006.01) |
| *F16D 25/08* | (2006.01) |
| *A01C 19/00* | (2006.01) |

(52) U.S. Cl.
CPC .............. *F16D 13/08* (2013.01); *A01C 7/088* (2013.01); *A01C 19/00* (2013.01); *F16D 25/088* (2013.01)

(58) Field of Classification Search
CPC ..... A01C 7/088; F16D 2300/08; F16D 25/12; F16D 13/08
See application file for complete search history.

(56) References Cited

U.S. PATENT DOCUMENTS

| | | |
|---|---|---|
| 4,684,001 A | 8/1987 | Carlson |
| 4,793,457 A | 12/1988 | Siewert et al. |
| 4,905,811 A | 3/1990 | Kitano et al. |
| 4,989,709 A | 2/1991 | Takeuchi |
| 5,230,413 A | 7/1993 | Lewis |
| 5,396,976 A | 3/1995 | Koitabashi |
| 5,485,962 A | 1/1996 | Moss |
| 5,638,932 A | 6/1997 | Mtzukami |
| 5,799,598 A * | 9/1998 | Stufflebeam ........... A01C 7/046 111/185 |
| 5,845,818 A | 12/1998 | Gregor |
| 5,992,595 A | 11/1999 | Adachi et al. |
| 6,035,087 A | 3/2000 | Fukuda |
| 6,085,886 A | 7/2000 | Fukuda |

(Continued)

FOREIGN PATENT DOCUMENTS

DE 19927833 A1 12/2000

OTHER PUBLICATIONS http://www.trimble.com/Agriculture/trucountaspx/TechnicalSupport/Installation, Version 1.00, Jun. 2010.*

(Continued)

*Primary Examiner* — Ramya Burgess
*Assistant Examiner* — Lillian Nguyen
(74) *Attorney, Agent, or Firm* — Rebecca L. Henkel; Rickard K. DeMille

(57) ABSTRACT

An air clutch cover for an air clutch assembly of an agricultural planter is provided. The air clutch cover includes a shell which may be removably installed onto the air clutch assembly. The shell has an opening sized to sealingly receive an air cylinder of the air clutch assembly therethrough. Sidewalls of the shell include cut-outs for allowing portions of the air clutch assembly to protrude outwardly from the air clutch cover.

16 Claims, 6 Drawing Sheets

(56) References Cited

U.S. PATENT DOCUMENTS

| | | |
|---|---|---|
| 6,385,968 B1 | 5/2002 | Ito |
| 6,561,337 B2 | 5/2003 | Takeda et al. |
| 6,811,011 B2 | 11/2004 | Bastian |
| 7,100,757 B2 | 9/2006 | Gunnerud et al. |
| 7,152,541 B2 | 12/2006 | Ptacek |
| 7,845,479 B2 | 12/2010 | Ochiai et al. |
| 2009/0191999 A1 | 7/2009 | Joseph et al. |

OTHER PUBLICATIONS

Yesterdaystractors.com: John Deere A Clutch Cover; Web-site: http://www.yesterdaystractors.com/John-Deere-A_Clutch-Cover_F821.html; Sep. 30, 2013.
https://web.archive.org/web/20090214141059/http://trimble.com/agriculture/trucount.aspx?dtID=overview; archive website; Feb. 14, 2009; Trimble.

* cited by examiner

AIR CLUTCH COVER

FIELD OF THE INVENTION

The invention relates generally to agricultural product application equipment such as planters, and in particular, to an air clutch cover for an air clutch assembly which provides a barrier against ingress of water, dust, and other foreign materials into an interior of a housing of the air clutch assembly.

BACKGROUND OF THE INVENTION

Conventional agricultural planters are often employed to deposit planting material. Many planters include a material dispensing implement that is towed behind a tractor or similar vehicle for distributing planting material, such as seed, fertilizer, pesticide, and other chemicals and materials, onto a furrowed farmland or similar planting surface. The implement may consist of multiple dispensing units that are supported by a common or shared frame that is towed by the tractor. The dispensing units, commonly referred to as row units, may be grouped into two sets—e.g., a left side set and a right side set.

Modern farming practices strive to minimize operating expenses. One way of reducing operating expenses is to reduce wasting seed by avoiding over-planting. Efforts have been made to avoid over-planting by using clutches, such as air clutches, to shut off the row units of a planter when the row units pass over a previously planted section of a field. For example, each set of row unit may be independently controlled, which allows the operator to selectively dispense material from either of the left and right side units or both units at the same time.

Selective activation or deactivation of row units may be accomplished by utilizing an air clutch assembly that controls individual row shutoff for any row unit. Typically, an air clutch assembly is associated with each row unit and is controlled pneumatically from the tractor cab using a GPS signal or manual controller. Because each row has its own air clutch assembly, the planter can be divided into as many sets or sections as desired, providing improved flexibility to the user. The air clutches are controlled to disengage by disconnecting power transmission to, and thus stop seed delivery from, seed meters at the row units when passing over a previously planted section of the field.

Air clutch assemblies have been increasingly popular because users are able to avoid double seeding and increase field yields. They have the advantages of being flexibly installed in many preexisting planters and work well with vacuum, air, and mechanical units. They are instantly activated and deactivated by user commands from a control unit and GPS so there is no lag time.

However, air clutches typically include multi-segmented housings that can develop separations at their joints over time. Even small separations can allow water, dust, and other foreign materials to make their way inside of, and contaminate, the air clutches. Contamination with foreign materials can cause air clutches to fail prematurely and otherwise degrade performance. One such performance degradation is contamination-induced binding in which the air clutch intermittently and unexpectedly shuts off or disengages. This correspondingly shuts off the seed meter and prevents seed delivery, leading to an unplanted portion of a furrow being worked by the row unit. These problems can cause a financial lost in terms of repair costs, as well as, lost production time.

Therefore, it is a primary object and feature of the present invention to provide an air clutch cover sealably protecting an air clutch assembly from foreign material ingress.

It is a further object and feature of the present invention to provide an air clutch cover including an air and liquid tight seal between the radially extending flange of the air clutch cover and an air cylinder of an air clutch to protect the top of the air clutch from foreign ingress.

It is a still further object and feature of the invention to allow the air clutch cover to be easily installed onto an air clutch assembly.

SUMMARY OF THE INVENTION

In accordance with the present invention, an air clutch cover is provided for protecting a seed planter air clutch from foreign debris. The air clutch includes a housing, an air cylinder extending from the housing, a driver sprocket assembly extending from a first side of the housing and a drive shaft extendable from a second side of the housing. The air clutch cover includes a shell having an opening therethrough and first and second sidewalls having cut-outs therein. The first and second sidewalls partially define an interior cavity in the shell. A collar surrounds the opening. The collar is sized to receive the air cylinder therethrough. The interior cavity is sized to receive the housing of the air clutch. The cut-out in the first sidewall extends about the driver sprocket assembly and the cut-out in the second sidewall extends about the drive shaft.

The collar is adapted to provide an air and liquid tight seal between the shell and the air cylinder. The shell includes a forward wall interconnecting the first and second sidewalls. The forward wall has a generally straight lower segment and a curved upper segment. A rearward wall also interconnects the first and second sidewalls. The rearward wall is generally curved along its entire length.

The shell has a hardness in the range of about 65 to 75 durometer type A and is constructed of an elastomeric material. For example, the shell may be constructed of a thermoplastic vulcanizate. It is contemplated for an inner diameter of the opening through the shell to be less than a diameter of the air cylinder to seal the opening against the outer surface of the air cylinder.

In accordance with a further aspect of the present invention, a clutch cover is provided for protecting an air clutch from debris. The air clutch includes an air cylinder, a housing depending from the air cylinder and a sprocket extending from the housing. The clutch cover includes a shell having an opening therethrough and first and second sidewalls defining an interior cavity therebetween for receiving the housing of the air clutch therein. A collar surrounds the opening and is sized to receive the air cylinder of the air clutch therethrough.

The first sidewall of the shell includes a cut-out therein. The cut-out is adapted for receiving the sprocket of the air clutch therethrough. The second sidewall may also include a cut-out therein. The cut-out of the second sidewall is adapted for receiving a drive shaft operatively connectable to the air clutch therethrough. The shell is constructed of an elastomeric material, e.g. of a thermoplastic vulcanizate. The shell has a hardness in the range of about 65 to 75 durometer type A.

In accordance with a still further aspect of the present invention, an air clutch assembly is provided for selectively delivering power to a seed meter of a row unit of a planter. The air clutch assembly includes an air clutch for selectively delivering power to the seed meter of the row unit of the planter. The air clutch includes a housing. A cover is positionable over the air clutch to prevent foreign objects from entering the housing of the air clutch.

The cover may include a shell having an opening therethrough and first and second sidewalls. The first and second sidewalls partially define an interior cavity in the shell for receiving the housing of the air clutch. A collar surrounds the opening. The first sidewall includes a cut-out therein. The cut-out adapted for receiving a sprocket assembly extending from the housing of the air clutch therethrough. The second sidewall may also include a cut-out therein. The cut-out of the second sidewall is adapted for receiving a drive shaft operatively connectable to the air clutch therethrough. The cover may have a hardness in the range of about 65 to 75 durometer type A and be constructed of a thermoplastic vulcanizate.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
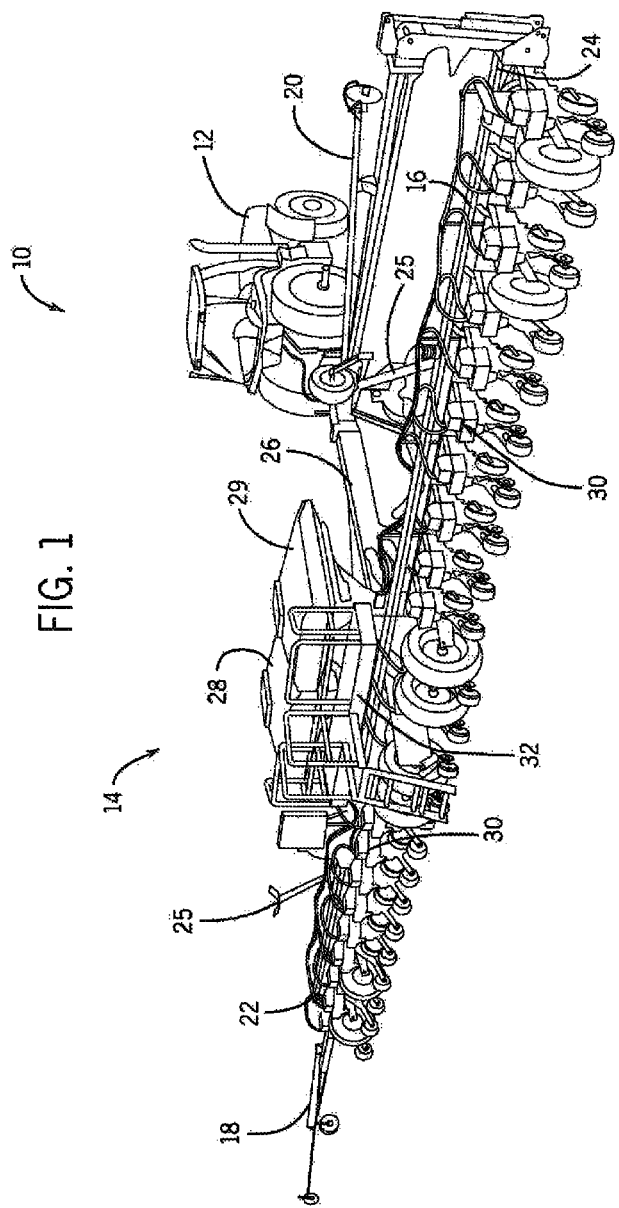
FIG. 1 is an isometric view of an agricultural planter incorporating an air clutch over in accordance with the present invention.

Referring now to the drawings, and more particularly to FIG. 1, there is shown an agricultural work system 10 that includes an agricultural work vehicle, such as a tractor 12 that tows an agricultural implement, which is depicted as a bulk-fill planter 14. Planter 14 can include a toolbar 16 with left and right marker assemblies 18, 20 that are attached to left and right ends 22, 24 of toolbar 16, respectively. Supports 25 can support marker assemblies 18, 20 when in a folded position.

Figure 2:
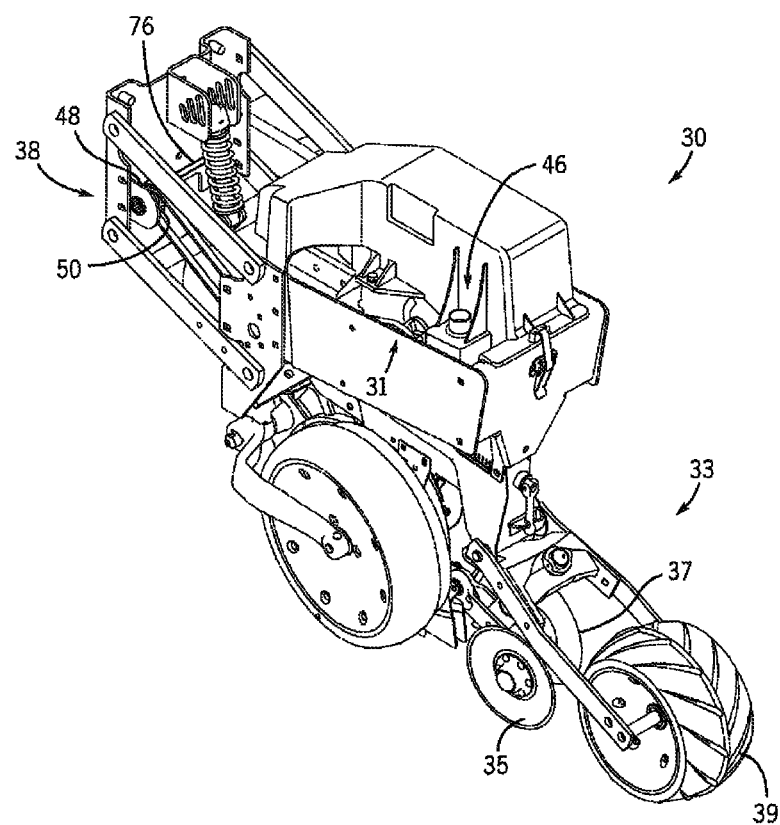
FIG. 2 is an isometric view of a row unit assembly of the agricultural planter of FIG. 1 incorporating the air clutch cover in accordance with the present invention.

Planter 14 can include other elements such as drawbar 26 for connection to the tractor 12, central bulk-fill hoppers 28, 29 which provide seeds to row units 30, and platform and gate assembly 32 for accessing and filling the bulk-fill hoppers 28, 29. Referring to FIG. 2, as is conventional, each seed or row unit 30 includes a furrow opening apparatus 33 having furrow opening discs (not shown), furrow closing discs 35 and 37 and a packer or press wheel 39. The opening discs (not shown) cut a furrow into the planting surface and seed (or fertilizer) is deposited into the furrow. Thereafter, the furrow closing discs 35 and 37 and trailing press wheel 39 causes soil to fall back into the furrow to cover the seed and then packs the planting surface. Each row unit 30 also includes an on-row hopper (or mini-hopper) 46 for receiving seed from the central bulk-fill hoppers 28 or 29. More specifically, at each row unit 30, mini hopper 46 pneumatically receives seed from the bulk-fill hoppers 28, 29 for delivery to the seed meter 31. Each seed meter 31 includes an internal seed disk that is selectively coupled to and rotated by a seed disk drive system 25, FIG. 3.

Figure 3:
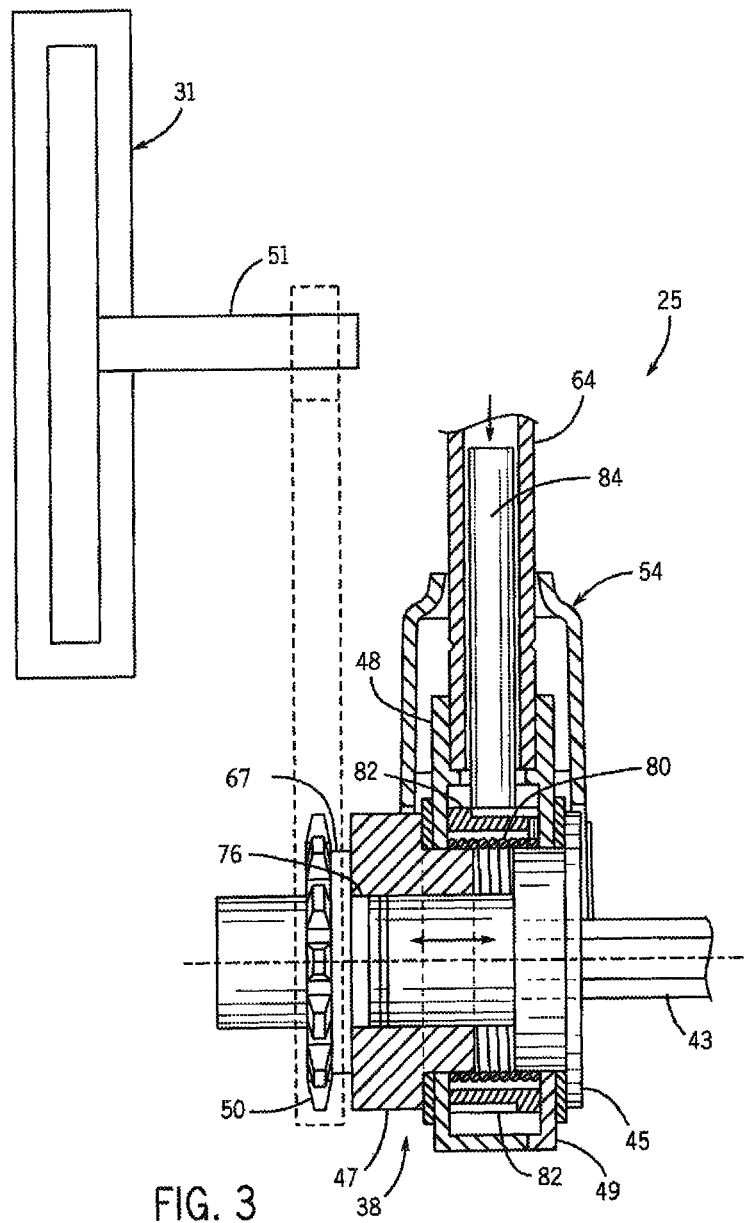
FIG. 3 is a schematic view of a seed disk drive system for use with the agricultural planter of FIG. 1.
Figure 4:
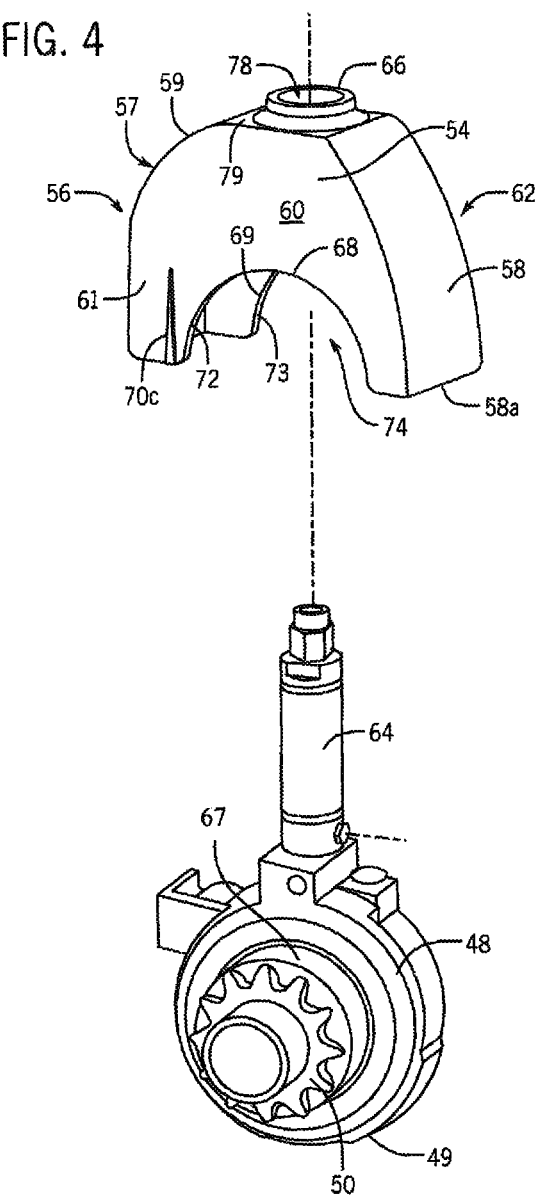
FIG. 4 is an exploded view of the air clutch assembly including the air clutch cover of the present invention and an air clutch.

Referring to FIG. 3, as is conventional, the seed drive system 25 includes a drive shaft 43 rotatably driven by, for example, movement of the planter 14 across a field to be seeded or an electric motor. It can be appreciated that the drive shaft 43 may by rotatably driven by other means without deviating from the scope of the present invention. The drive shaft 43 is coupled to a rotatable input huh 45 within the housing 49 of an air clutch 48 of an air clutch assembly 38. As seen best in FIG. 4, the air clutch 48 further includes an air cylinder 64 projecting from a first side of the housing 49 and a shaft 76, FIGS. 4 and 6, extending from the housing 49 along an axis generally perpendicular to the air cylinder 64. The shaft 76 is operatively connected to a driver sprocket 50 extending about the outer periphery thereof such that rotation of the shaft 76 causes rotation of the driver sprocket 50. Cylindrical member 67 projects from the housing 49 and spaces the driver sprocket 50 from the housing to minimize potential interference with the driver sprocket 50 during the rotation thereof.

The air clutch 48 further includes a pneumatically movable, rotatable output hub 47 positioned within the housing 49 which, is interconnected to the driver gear or sprocket 50 by shaft 76. The rotatable input hub 45 is connected to the output hub 47 by a coil spring 80 disposed therebetween. The tension forces of the coil spring 80 translate the rotation of the input hub 45 to the output hub 47 when the coil spring 80 is wound. A stop collar 82 is assembled around the coil spring 80 and connected to the coil spring 80 via a spring tab. The driver sprocket 50 is coupled, in turn, to a rotatable meter shaft 51 operatively connected to extend from the seed disk of the seed meter 31 by means of a drive chain, drive belt, gear arrangement or the like such that rotation of the driver sprocket 50 is translated to the seed disk of the seed meter 31.

In operation, it is intended for the seed drive system 25 to selectively rotate at least a surface of the seed disk through a seed pool inside of the seed meter 31 to pick up and singulate seeds from the internal seed pool and convey the individual seeds out of the seed meter 31 through a seed tube for deposition into the soil. More specifically, the seed deposition may be controlled by selectively engaging and disengaging rotation of the seed meter 31 by means of an air clutch assembly 38, FIG. 3. By way of example, as hereinafter described, with the output hub 47 of the air clutch 48 in an engaged position (the output hub 47 receives rotation from the input hub 45), rotation of drive shaft 43 drives the seed meter 31 to rotate. Alternatively, with the output hub 47 of the air clutch 48 in an disengaged position (the output hub 47 does not receive rotation from the input hub 45), the drive shaft 43 of the seed drive system 25 is rotatably uncoupled from the seed meter 31, thereby stopping seed deposition into the soil. It is contemplated for the output hub 47 of the air clutch 48 to be biased into the engaged position.

Figure 5:
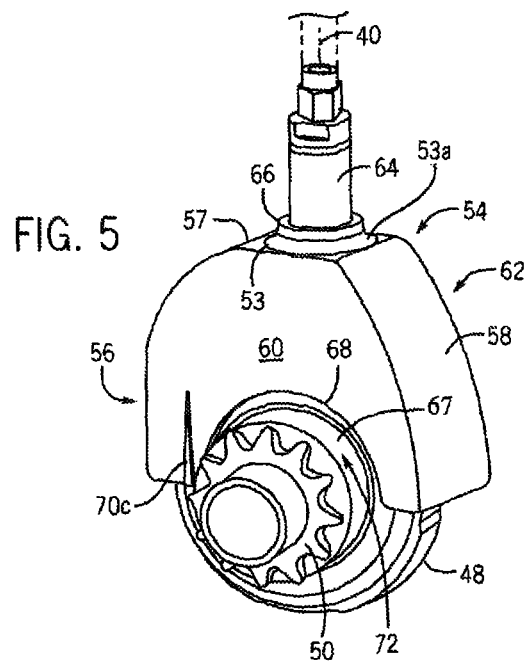
FIG. 5 is an isometric view of the air clutch cover of the present invention mounted on the air clutch of the air clutch assembly.

Referring now to FIG. 5, the air cylinder 64 of the air clutch 48 of the air clutch assembly 38 is in communication with a pneumatic source (not shown) through air tube 40 for moving a movable rod 84 inward and outward from the air clutch 48 and to engage and disengage the stop collar 82. This, in turn, moves the output hub 47 between its engaged and disengaged positions. The pneumatic source, in turn, is operatively connected to a controller that controls the supply of compressed air from the pneumatic source to the air cylinder 64 of the air clutch assembly 38 in response to a manual command, a preprogrammed set of instructions or a selected geographical location obtained via global positioning system (GPS). When deactivated by the controller, the supply of compressed air to the air cylinder 64 of air clutch 48 through the pneumatic tube 40 is shut off such that the movable rod 84 is positioned within the air clutch and disengaged from the stop collar 82, and the output hub 47 of the air clutch 48 is biased into the engaged position wherein the coil spring 80 causes a tension force with the input hub 45 causing rotation of the output hub 47 of the seed meter 31, as heretofore described. Alternatively, when activated by the controller, the pneumatic source supplies compressed air to the air cylinder 64 of air clutch 48 through the pneumatic tube 40 which, in turn, actuates the movable rod 84 to move outward of the air cylinder 64 and to engage the stop collar 82 and stop rotation of the stop collar 82. Rotation of the stop collar 82 is stopped, and due to its connection with the coil spring 80 via the spring tab, it forces the coil spring 80 to unwind. When the coil spring 80 unwinds, the output hub 47 loses its tension force with the input hub 45 and assumes the disengaged position, thereby uncoupling the drive shaft 43 of the seed drive system 25 from the seed meter 31 and stopping seed deposition into the soil.

Figure 6:
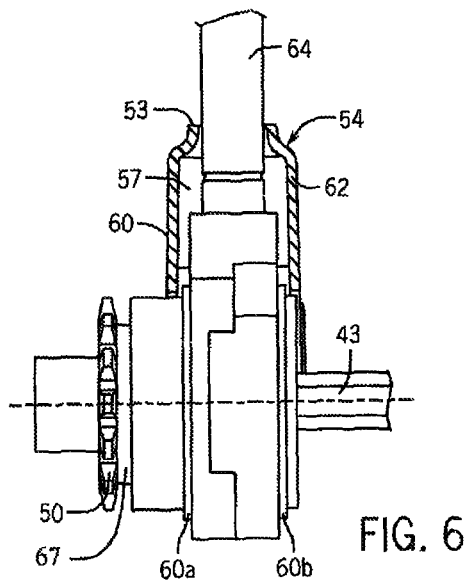
FIG. 6 is an end view of the air clutch assembly of FIG. 5.
Figure 7:
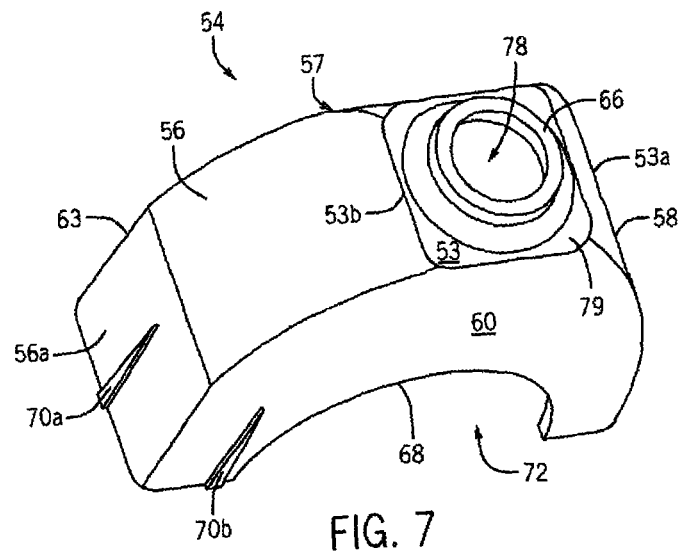
FIG. 7 is a top isometric view of the air clutch cover of the present invention.
Figure 8:
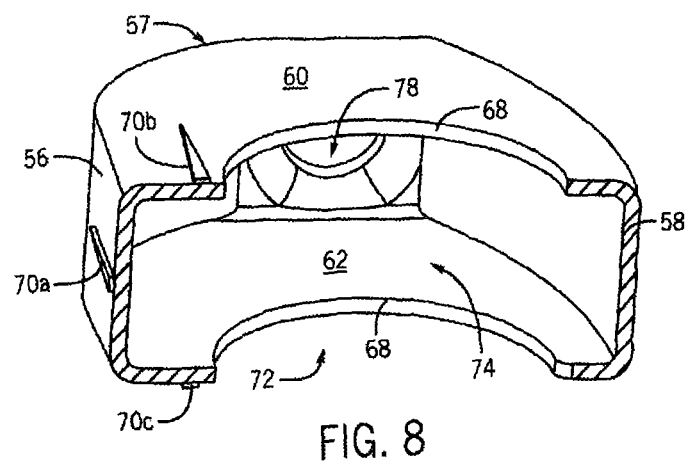
FIG. 8 is a bottom isometric view of the air clutch cover of the present invention.

Referring now to FIGS. 4-8, in order to sealably protect the air clutch assembly 38 from the ingress of foreign material into the interior thereof, an air clutch cover 54 is installed on/positioned over the air clutch 48 of the air clutch assembly 38. The air clutch cover 54 is preferably fabricated from a resilient material and is defined by a shell 57 having first and second sidewalls 60 and 62, respectively, generally parallel to each other. The first and second sidewalls 60 and 62, respectively, are interconnected by a generally flat upper wall 53 having an arcuate rear wall 58 extending from a first edge 53a of upper wall 53 and terminating at a lower edge 58a. A forward wall 56 extends from a second edge 53b of upper wall 53 and terminates at a lower edge 56a. The lower edge of 56a of forward wall 56 is generally co-planar with lower edge 58a of rear wall 58 and with the lower edges 60a and 62a of the first and second sidewalls 60 and 62, respectively. As best seen in FIG. 7, forward wall 56 includes an arcuate portion 59 extending from the second edge 53b of upper wall 53 and a generally flat portion 61 extending from lower edge 56a. The arcuate portion 59 of forward wall 56 and the flat portion 61 of forward wall 56 intersect at intersection 63 which is perpendicular to the first and second sidewalls 60 and 62, respectively. The interior surfaces of the first and second sidewalls 60 and 62, respectively, the rear wall 58 and the forward wall 56 define an interior cavity 74 within air clutch cover 54 that is sized for receipt of the air clutch 48.

The lower edges 60a and 62a of the first and second sidewalls 60 and 62, respectively, include corresponding semi-circular cut-outs 72 and 73, respectively, provided therein. Cut-outs 72 and 73 are aligned with each other and defined by half-circular rims 68 and 69, respectively, provided in the lower edges 60a and 62a of the first and second sidewalls 60 and 62, respectively. As hereinafter described, the cut-outs 72 and 73 are adapted for receiving the cylindrical member 73 projecting from the housing 49 and the drive shalt 43, respectively.

The upper wall 53 of shell 57 of the air clutch cover 54 includes an opening 78 therein. Opening 78 in upper wall 53 has a diameter of sufficient size to allow for the passage of air cylinder 64 therethrough. Air clutch cover 54 further includes, a resilient collar 66 surrounding the opening 78 in upper wall 53 along the upper surface 79 thereof. The collar 66 extends longitudinally upwards from the upper wall 53 and is intended to form a sealing engagement with the air cylinder 64 disposed therein, as further described below. It can be appreciate that the inner diameter of the opening 78 and/or the inner diameter of the collar 66 may be slightly smaller than the diameter of the air cylinder 64 such that when the air cylinder 64 is inserted, through the opening 78 and the collar 66, the opening 78 in upper wall 53 and/or the collar 66 stretches to accommodate the air cylinder 64 and forms a sealable interface with the outer surface of the air cylinder.

In order to add strength and stability to air clutch cover 54, it is contemplated to provide one or more ribs 70a-70c on the outer surface of shell 57. Additionally, the ribs 70a-70c serve as indicators for the centers of the clutch's through hole and threaded hole features. By way of example, a first rib 70a may be formed along the outer surface of flat portion 61 of forward wall 56, FIG. 5. The rib 70a extends from lower edge 56a of forward wall 56 and lies in a plane generally parallel to first and second sidewalls 60 and 62, respectively. In the depicted embodiment, the rib 70a has a generally rectangular cross-section. However, other configurations are possible without deviating from the scope of the present invention, such as triangular cross-section. Second and third ribs 70a and 70b, respectively, may be formed along the outer surfaces of first and second sidewalls 60 and 62, respectively. The second and third ribs 70a and 70b, respectively, extend from the lower edges 60a and 62a of the first and second sidewalls 60 and 62, respectively, along corresponding axes perpendicular to the lower edges 60a and 62a of the first and second sidewalls 60 and 62, respectively. Once again, in the depicted embodiment, the second and third ribs 70b and 70c have a generally rectangular cross-section. However, other configurations are possible without deviating from the scope of the present invention, such as triangular cross-section, it is contemplated for additional ribs to be provided at different locations along the outer surface of shell 57 of air clutch cover 54 to provide strength and stability to air clutch cover 54.

As previously noted, the shell 57 of the air clutch cover 54 from a resilient or elastomeric material, such as rubber or thermoplastic elastomer. For example, the shell may be fabricated from a thermoplastic vulcanizate having a durameter 70±5 type A and may have a thickness of 3±0.5 millimeters (mm). It is intended for shell 57 to have sufficient flexibility to facilitate the installation of the air clutch cover 54 on the air clutch 48, while preventing foreign objects from entering the housing 49 of air clutch 48 when installed on housing 49, as hereinafter described.

In operation, prior to connecting the air cylinder 64 to the pneumatic source via an air tube 40, the housing 49 of the air clutch 48 is inserted into the interior cavity 74 within air clutch cover 54. In addition, the air cylinder 64 is inserted through the opening 78 in the upper wall 53 in shell 57 and collar 66 of air clutch cover 54. As heretofore described, the opening 78 in upper wall 53 and the collar 66 stretch to accommodate the air cylinder 64 and form an air and liquid tight seal with the outer surface of the air cylinder 64. An additional gasket (not shown) may be used to reinforce the seal between the opening 78 and the collar 66 combination and the air cylinder 64. With the housing 49 of the air clutch 48 received in the interior cavity 74 within air clutch cover 54, the inner surfaces of the first and second sidewalls snugly engage the sides of the housing 49 of the air clutch

48 to further prevent foreign objects from entering the housing 49 of the air clutch 48. In addition, with the housing 49 of the air clutch 48 received in the interior cavity 74 within air clutch cover 54, the cut-outs 72 and 73 in first and second sidewalls 60 and 62, respectively, extend about and receive the cylindrical member 67 projecting from the housing 49 and the drive shaft 43, respectively.

Referring to FIGS. 5 and 6, after installation of the air clutch cover 54 onto the air clutch 48, the air cylinder 64 may be connected to the air tube 40 allowing pressurized air to flow therebetween, for reasons heretofore described. The air clutch cover 54 protects the air clutch 48 from foreign debris entering the mechanical parts within its interior, such as its various internal moving parts. It is further noted, the air clutch cover 54 may be easily removed from the air clutch 48 by disconnecting the air cylinder 64 from the air tube 40 and sliding the housing 49 of the air clutch 48 from the interior cavity 74 of the air clutch cover 54.

Many changes and modifications could be made to the invention without departing from the spirit thereof. The scope of these changes will become apparent from the appended claims.

We claim:

1. An air clutch cover for protecting a seed planter air clutch from foreign debris, the air clutch including a housing, an air cylinder extending from the housing and a driver sprocket assembly extending from a first side of the housing and a drive shaft extendable from a second side of the housing, the air clutch cover comprising:
   a shell having an opening therethrough and including:
      first and second sidewalls having cut-outs therein, the first and second sidewalls having lower edges and partially defining an interior cavity in the shell;
      a forward wall interconnecting the first and second sidewalls, the forward wall having a generally straight lower segment terminating at a lower edge and a curved upper segment; and
      a rearward wall interconnecting the first and second sidewalls, the rearward wall having a length and terminating at a lower edge spaced from the lower edge of the lower segment of the forward wall; and
   a collar extending along an axis and surrounding the opening, the collar fabricated from a resilient material and being configured to sealably engage an outer surface of the air cylinder passing through the opening;
   wherein:
      the lower edges of the first and second sidewalls include corresponding first and second arcuate rims defining the cut-outs in the first and second sidewalls, the cut-outs in the first and second sidewalls being axially aligned;
      the lower edges of the first sidewall, the second sidewall, the forward wall and rearward wall define a clutch opening for allowing at least a portion of the housing to pass therethrough into the interior cavity;
      the axis extends through the clutch opening;
      the interior cavity is sized to receive the housing of the air clutch; and
      the cut-out in the first sidewall extending about the driver sprocket assembly and the cut-out in the second sidewall extending about the drive shaft.

2. The air clutch cover of claim 1 wherein the collar is adapted to provide an air and liquid tight seal between the shell and the air cylinder.

3. The air clutch cover of claim 1 wherein the shell has a hardness in a range of about 65 to 75 durometer type A.

4. The air clutch cover of claim 1 wherein the shell is constructed of an elastomeric material.

5. The air clutch cover of claim 4 wherein the shell is constructed of a thermoplastic vulcanizate.

6. The air clutch cover of claim 1 wherein the shell is fabricated from a resilient material such that an inner diameter of the opening through the shell is stretchable between a first diameter which is less than a diameter of the air cylinder and a second diameter which is greater than the diameter of the air cylinder.

7. A clutch cover for protecting an air clutch from debris, the air clutch including an air cylinder, a housing depending from the air cylinder and a sprocket extending from the housing, the clutch cover comprising:
   a shell having an opening therethrough and including:
      first and second sidewalls having lower edges and defining an interior cavity therebetween for receiving the housing of the air clutch therein, the lower edges of the first and second sidewalls including arcuate rims formed therein which define cut-outs in the first and second sidewalls;
      a forward wall interconnecting the first and second sidewalls, the forward wall having a generally straight lower segment terminating at a lower edge and a curved upper segment; and
      a rearward wall interconnecting the first and second sidewalls, the rearward wall having a length and terminating at a lower edge spaced from the lower edge of the lower segment of the forward wall; and
      a collar extending along an axis, surrounding the opening, and sized to receive the air cylinder of the air clutch, the collar fabricated from a resilient material and being configured to sealably engage an outer surface of the air cylinder passing through the opening;
   wherein:
      the cut-outs in the first and second sidewalls are axially aligned;
      the lower edges of the first sidewall, the second sidewall, the forward wall and rearward wall define a clutch opening for allowing at least a portion of the housing to pass therethrough into the interior cavity the axis passes through the clutch opening.

8. The clutch cover of claim 7 wherein the cut-out in the first sidewall is semi-circular and adapted for receiving the sprocket of the air clutch therethrough.

9. The clutch cover of claim 8 wherein the cut-out of the second sidewall is semi-circular and is adapted for receiving a drive shaft operatively connectable to the air clutch therethrough.

10. The clutch cover of claim 7 wherein the shell is constructed of an elastomeric material.

11. The clutch cover of claim 10 wherein the shell is constructed of a thermoplastic vulcanizate.

12. The clutch cover of claim 7 wherein the shell has a hardness in a range of about 65 to 75 durometer type A.

13. An air clutch assembly for selectively delivering power to a seed meter of a row unit of a planter, the air clutch assembly comprising:
   an air clutch for selectively delivering power from a drive shaft to the seed meter of a row unit of the planter, the air clutch including a housing; and
   a cover positionable over the air clutch to prevent foreign objects from entering the housing of the air clutch, the cover includes:
      a shell having an opening therethrough and including:

first and second sidewalls having cut-outs therein, the first and second sidewalls having lower edges and partially defining an interior cavity in the shell for receiving the housing of the air clutch;
a forward wall interconnecting the first and second sidewalls, the forward wall having a generally straight lower segment terminating at a lower edge and a curved upper segment; and
a rearward wall interconnecting the first and second sidewalls, the rearward wall having a length and terminating at a lower edge spaced from the lower edge of the lower segment of the forward wall; and
a collar extending along an axis and surrounding the opening, the collar fabricated from a resilient material and being configured to sealably engage an outer surface of an air cylinder passing through the opening;
wherein:
the lower edges of the first and second sidewalls including arcuate rims formed therein which define cut-outs in the first and second sidewalls;
the lower edges of the first sidewall, the second sidewall, the forward wall and rearward wall define a clutch opening for allowing at least a portion of the housing to pass therethrough into the interior cavity; and
the axis passes through the clutch opening.

14. The air clutch assembly of claim 13 wherein:
the arcuate rim defining the cut-out in the first sidewall extends partially about a sprocket assembly extending from the housing of the air clutch; and
the arcuate rim defining the cut-out in the second sidewall extends partially about the drive shaft operatively connectable to the air clutch.

15. The air clutch assembly of claim 13 wherein the cover has a hardness in a range of about 65 to 75 durometer type A.

16. The air clutch assembly of claim 13 wherein the cover is constructed of a thermoplastic vulcanizate.

* * * * *